(12) United States Patent
Kameyama

(10) Patent No.: US 8,176,741 B2
(45) Date of Patent: May 15, 2012

(54) LOCAL AIR CONDITIONING SYSTEM FOR VEHICLE AND METHOD OF CONTROLLING LOCAL AIR CONDITIONING UNIT

(75) Inventor: Shougo Kameyama, Chiryu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 1141 days.

(21) Appl. No.: 11/967,843

(22) Filed: Dec. 31, 2007

(65) Prior Publication Data

US 2008/0168787 A1    Jul. 17, 2008

(30) Foreign Application Priority Data

Jan. 11, 2007  (JP) .................................. 2007-3354

(51) Int. Cl.
F25B 21/02 (2006.01)
(52) U.S. Cl. ............... 62/3.3; 62/3.61; 62/239
(58) Field of Classification Search ............ 62/3.3, 62/239, 3.61
See application file for complete search history.

(56) References Cited

U.S. PATENT DOCUMENTS

2005/0268621 A1* 12/2005 Kadle et al. ............. 62/3.2

FOREIGN PATENT DOCUMENTS

| JP | 2-4450 | 1/1990 |
|---|---|---|
| JP | 05-277020 | 10/1993 |
| JP | 2002-233431 | 8/2002 |
| JP | 2002-267241 | 9/2002 |
| JP | 2003-034167 | 2/2003 |
| JP | 2003-169727 | 6/2003 |
| JP | 2003-312391 | 11/2003 |
| JP | 2006-131106 | 5/2006 |
| JP | 2006-160024 | 6/2006 |

OTHER PUBLICATIONS

Machine translation of JP 2006-160024 on Aug. 13, 2011.*
Japanese Office Action dated Sep. 16, 2008 issued in counterpart Japanese Application No. 2007-003354, with English translation.

* cited by examiner

Primary Examiner — Cheryl J Tyler
Assistant Examiner — Jonathan Koagel
(74) Attorney, Agent, or Firm — Nixon & Vanderhye PC

(57) ABSTRACT

A local air conditioning system for a vehicle includes a local air conditioning unit for performing one of a cooling operation and a heating operation for a predetermined portion of a seat of the vehicle. In the local air conditioning system, information regarding a user is acquired, and a current scene is identified based on the acquired information. The local air conditioning unit is controlled to perform one of the cooling operation and the heating operation for the predetermined portion of the seat on condition that the current scene is identified as a getting-in-vehicle scene in which the user gets in the vehicle and sits on the seat. For example, the predetermined portion of the seat is a portion corresponding to a high body temperature portion of a user, such as a nape of a neck and backs of knees.

21 Claims, 8 Drawing Sheets

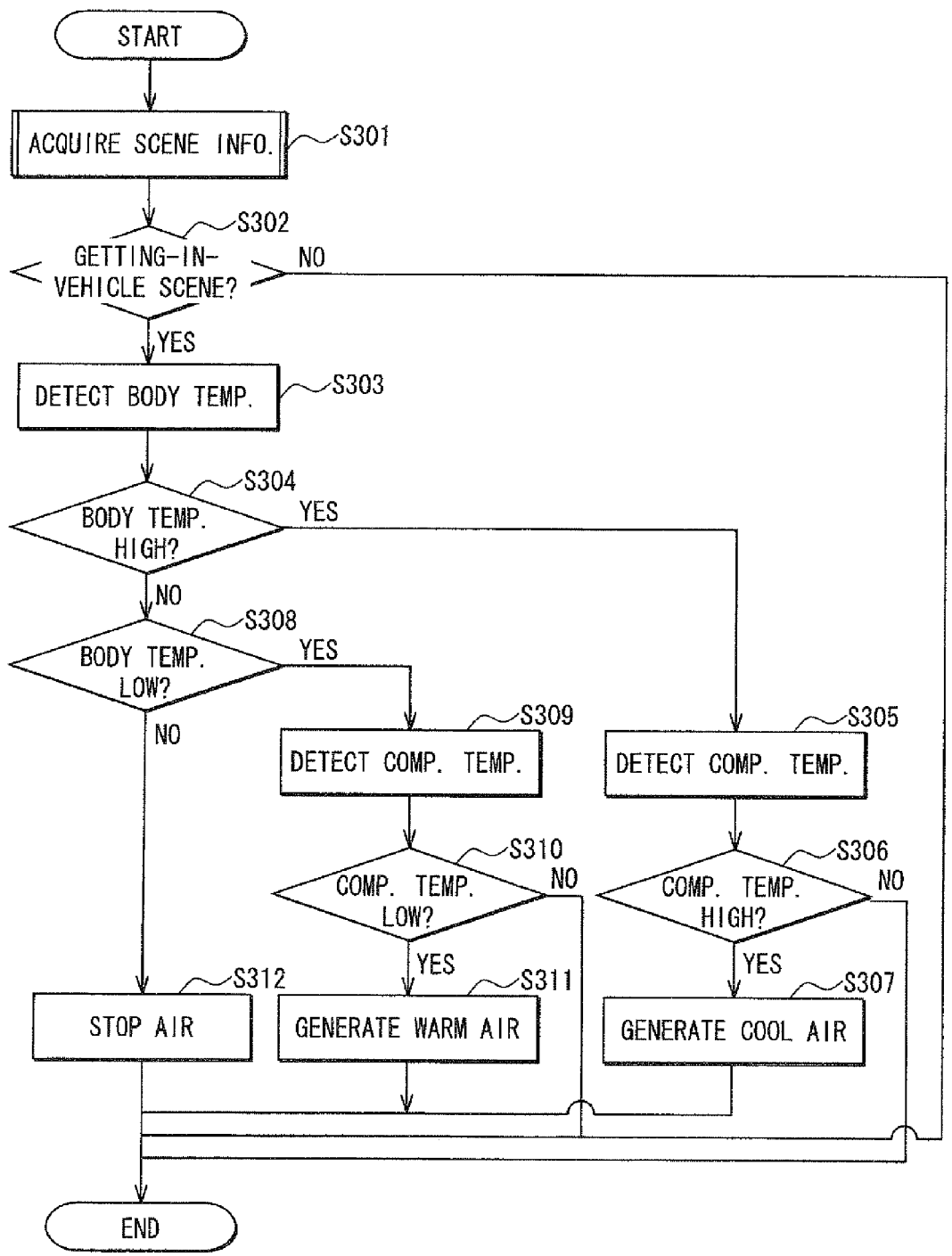

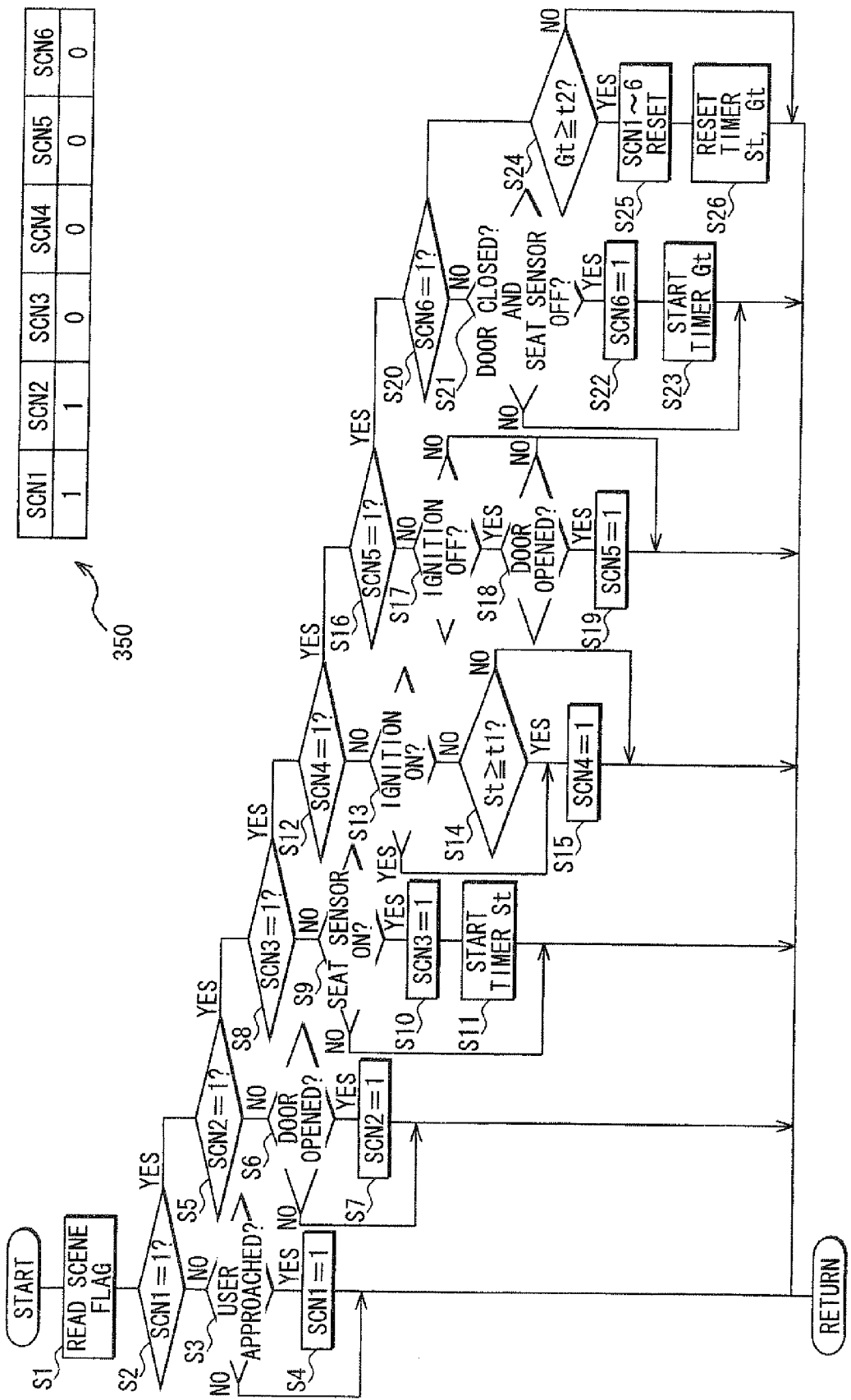

LOCAL AIR CONDITIONING SYSTEM FOR VEHICLE AND METHOD OF CONTROLLING LOCAL AIR CONDITIONING UNIT

CROSS REFERENCE TO RELATED APPLICATION

This application is based on Japanese Patent Application No. 2007-3354 filed on Jan. 11, 2007, the disclosure of which is incorporated herein by reference.

FIELD OF THE INVENTION

The present invention relates to a local air conditioning system for a vehicle, and a method of controlling a local air conditioning unit.

BACKGROUND OF THE INVENTION

In general, a passenger compartment of a vehicle such as an automobile is relatively small, and becomes a closed space when windows are closed. The temperature inside the passenger compartment is easily affected by an ambient condition, such as the weather. For example, when a vehicle is parked in sunlight, such as in summer, the temperature of the passenger compartment is abnormally raised by heat ray entering through window glasses. An ordinary air conditioning unit for a vehicle is a central type unit and is designed to air-condition a whole space of the passenger compartment. Therefore, it is likely to take time to control the temperature by such an air conditioning unit.

For example, Japanese Unexamined Patent Publication JP-2006-131106A describes mounting a local air conditioning unit in a seat and to discharge air-conditioned air whose temperature is adjusted from blowoff ports formed in a headrest and an armrest, thereby to air-condition the interior of a passenger compartment. Moreover, JP-2006-131106A describes mounting a Peltier module in a seatback or a seat cushion and transferring heat generated by the Peltier module to a seat surface through a heat conductive sheet.

Also, in a local air conditioning unit described in Japanese Unexamined Patent Publication JP-2002-233431A, a fan is mounted in a seat for generating a flow of air toward a Peltier module. The air blown by the fan is conditioned through the Peltier module and is blown off from a seat surface.

SUMMARY

The present invention is made in view of the foregoing matter, and it is an object of the present invention to provide a local air conditioning system for a vehicle and a method of controlling a local air conditioning unit for a seat of a vehicle, capable of performing a local air conditioning operation timely and efficiently.

According to a first aspect of the present invention, a local air conditioning system for a vehicle includes a local air-conditioning unit, information acquiring means, scene identifying means for identifying a current scene of a user, and controlling means for controlling the local air-conditioning unit. The local air-conditioning unit is disposed in a seat of the vehicle and configured to perform a focal air conditioning operation for a predetermined portion of the seat. A series of user's operations and actions relating to utilizing the vehicle from approaching the vehicle, getting in the vehicle, driving or staying in the vehicle to getting-off the vehicle is previously divided into a plurality of scenes. The information acquiring means acquires information relating to a position or action of a user as scene estimation information, and the scene identifying means identifies individual scenes on the basis of the acquired scene estimation information. The controlling means operates the local air-conditioning unit on condition that a current scene is identified by the scene identifying means as a getting-in-vehicle scene in which the user gets in the vehicle and sits on the seat.

In the first aspect, the local air-conditioning unit is operated on condition that the current scene is identified as the getting-in-vehicle scene in which the user gets in the vehicle and sits on the seat by the scene identifying means. The predetermined portion of the vehicle, for example, correspond to a high body temperature portion. With this, an uncomfortable feeling in temperature received by the user just after the user gets in the vehicle can be timely and efficiently lessened by providing the local air conditioning operation, such as a cooling operation or a heating operation, for the high body temperature portion.

In general, human sensory temperature depends on human body temperature. To regulate the human body temperature efficiently, it is sufficient to warm or cool portions in which blood flow is large as a priority. For example, the portions where blood flow is large include the nape of the neck, the back of the knee, the groin, and the armpit and such portions are generally recommended to be cooled when a human body develops a fever. In general, the cooling or warming of the forehead or the face is not effective but is likely performed because the cooling or warming of the forehead or the face makes a human feel comfortable.

Considering the posture of the user seated on the seat, a region around the nape of the neck or a region around the backs of the knees are comparatively easily cooled or heated. Thus, the predetermined portion of the seat is, for example, a portion corresponding to the region around the nape of the neck of a user seated on the seat and a portion corresponding to the region around the backs of the knee of the user.

According to a second aspect of the present invention, the local air conditioning system for a vehicle further includes body temperature measuring means for measuring a body temperature of a user seated on the seat. If the local air-conditioning unit is operated in a case where the user who has just gotten in the vehicle does not feel hot so much, that is, the user does not want local cooling; the user may feel uncomfortable all the more. Therefore, the controlling means controls the local air conditioning unit to perform the cooling operation on condition that a measured body temperature is equal to or higher than a predetermined first body temperature. Since the body temperature of the user is measured by the body temperature measuring means, the local air-conditioning unit can perform the cooling operation on condition that a measured body temperature is higher than a predetermined first body temperature. Accordingly, by referring to the body temperature of the user, it is possible to estimate whether or not the user feels hot at a comparatively high probability. Thus, it is possible to perform the local cooling operation more properly when the user gets in the vehicle.

As an example, the body temperature measuring means can be a thermographic device (thermography shooting unit) that shoots the thermography of a bared portion (exposed skin) of and above the neck of the user seated on the seat. In this case, the body temperature of the user can be found accurately by measuring the temperature of the bared portion of the user. In general, the thermographic device can detect the body temperature in a non-contact manner. The body temperature can be measured without giving the user an uncomfortable feeling. The body temperature measuring means can be provided by other temperature measuring means of non-contact type such as an IR sensor and a radiation thermometer, in place of the thermographic device.

In the case that the thermographic device is employed as the body temperature measuring means, the temperature distribution of the bared portion of the user can be acquired. Thus, when the user feels hot, a portion where temperature easily increases can be identified and hence body temperature information that is more useful for the local air conditioning operation can be obtained.

The portion where temperature easily increases is the above-mentioned high body temperature portion. For example, a region around the nape of the neck corresponds to the bared portion of and above the neck. Thus, the body temperature measuring means can be configured to identify the region around the nape of the neck of the user as the high body temperature portion on a thermographic image shot by the thermographic device.

In this case, the controlling means controls the local air-conditioning unit to perform the cooling operation on condition that the temperature of the region around the nape of the neck is higher than the predetermined first body temperature. With this, it is possible to more properly perform the local cooling operation when the user gets in the vehicle.

According to a third aspect of the present invention, the local air conditioning system includes passenger compartment temperature measuring means for measuring temperature in the passenger compartment of the vehicle. The controlling means controls the local air-conditioning unit to perform the cooling operation on condition that the measured temperature of the passenger compartment is equal to or higher than a predetermined first compartment temperature. With this construction, the local cooling operation is effectively performed when the passenger compartment is in a high temperature condition.

According to a fourth aspect of the present invention, the local air-conditioning unit includes an air-generating mechanism for generating a cool air or a warm air toward the high body temperature portion. The method of generating air-conditioned air such as the cool air or the warm air and blowing off the air-conditioned air to the high body temperature portion can smoothly cool or heat the body and can smoothly lessen user's uncomfortable feeling when the user gets in the vehicle.

As the air-generating mechanism, the local air-conditioning unit may employ an independent refrigeration mechanism built-in a seat and an air generating mechanism using a duct, as disclosed in JP-2006-131106A. In this case, however, the local air-conditioning unit needs to use an engine for a compressor power source and needs to lay piping for circulating refrigerant from an engine compartment to the seat. As such, its structure is likely to be complex. Moreover, it may be difficult to immediately produce air-conditioned air, such as the cool air until the piping and the refrigerant are cooled. Further, unless the engine is not started, the local air-conditioning unit is not operated. Thus, the local air-conditioning unit employing the above mechanisms as the air-generating mechanism raises the problem of going against an environmental trend to encourage idle stop.

According to a fifth aspect of the present invention, therefore, the local air conditioning unit includes a Peltier module. In this case, the above-mentioned refrigerant piping is not required and a simple construction like an electric wire being run to the Peltier module is required. Thus, a structure of the local air conditioning unit is simplified. Moreover, even if the engine is not started, the local air-conditioning unit can be operated only by supplying electricity to the Peltier module.

However, in principle, the Peltier module transmits heat via thermal electrons when it is supplied with electric power from an external device, so the Peltier module is a power device of high power consumption (even a small module that can be built in the seat consumes 5 to 15 A and 50 to 150 W). For example, the Peltier module raises a problem that when the Peltier module is continuously operated for a long time without starting the engine, the battery is easily consumed.

Thus, the operation of the Peltier module is started when the getting-in-vehicle scene arrives. As such, a period of time during which the Peltier module is operated in a state where the engine is stopped and an alternator is not operated can be decreased to a comparatively short time after the user gets in the vehicle until the engine is started. Thus, the consumption of the battery is reduced.

When the Peltier module is employed, it is preferable that the following mode is employed. First, the predetermined portion of the seat, that is, the high body temperature portion is determined in an area excluding a portion that makes close contact with the body of the user seated on the seat. The air-generating mechanism is constructed so as to include the Peltier module, the drive unit for driving the Peltier module such that a first side (cooling block) is brought into a cold side when energized in a forward polarity, a blower for generating air to the first side of the Pettier module, and an air guide passage part that is embedded and disposed in the seat and guides air having passed through the first side of the Peltier module toward a blowoff port formed in correspondence to the high body temperature portion.

In the construction employed in JP-2006-131106A, a cooling block of the Peltier module is embedded in the seatback and the cold from the cooling block is transmitted by heat conduction to a portion, which is in contact with the back of the user, of moquette via a cooling sheet. Thus, it takes time for the cold to pass through the cushion layer of the moquette, which raises the problem that the construction lacks a quick-acting nature. On the other hand, in the construction employed in JP-2002-233431A, air is sent by the blower to the cooling block and the cool air is blown off upward in the front portion of the seat cushion. The thigh of the user is in close contact with the front portion to interfere with the blow-off of the cool air. Thus, this construction has the disadvantage that cooling efficiency at the high body temperature portion such as the back of the knee is very low.

However, in the above-mentioned construction of the fifth aspect, blowoff ports are formed at positions that face the high body temperature portions, which are not in close contact with the seat, such as the backs of the knees and the nape of the neck. Thus, the air-conditioned air can be blown off at a distance to the high body temperature portions of the user seated on the seat.

In the air-generating mechanism, for example, the Peltier module and the blower are integrally embedded in the seat along with the air guide passage part. Thus, the air-generating mechanism is compact, and the process of assembling is simplified. Moreover, a change of design of a vehicle body is not required.

For example, the air-generating mechanism is constructed in such a way that the Peltier module and the blower are integrally embedded in the seatback of the seat along with the air guide passage part. In this case, the air guide passage part is disposed in such a way that the blowoff ports are opened in both side portions of a headrest of the seat. With this, even immediately after the user gets in the passenger compartment filled with a stifling fever, since the air-conditioned air such as a cold air is blown toward the nape of the neck, an uncomfortable feeling of the user is smoothly lessened.

In this case, the Peltier module can be embedded in a lower portion of the seatback in such a way that the first side (cooling block) faces the front side of the seatback, for example. The air guide passage part is constructed so as to have a seatback passage portion for guiding air having passed through the first side upward. The heat sink of the Peltier module is disposed so as to face the back side of the seatback and radiates exhaust heat from the heat sink from a heat radiating port formed in the back of the seatback. With this, the exhaust heat from the Peltier module is not exhausted to the front side of the seat and the blowing-off of the cool air to the region around the nape of the neck is not disturbed. Moreover, since the exhaust heat is discharged from the heat radiation port into the passenger compartment, a heat exhaust duct is not required.

When the Peltier module is operated to perform the cooling operation, the exhaust heat from the Peltier module is discharged into the passenger compartment and hence there is not developed a heat balance to shift the whole space in the passenger compartment in a cooling direction. In other words, no matter how long the Peltier module is operated, the average temperature of the whole space in the passenger compartment is not lowered. On the contrary, there is a possibility that the temperature in the passenger compartment will be raised by the addition of joule heat produced by power consumption. However, even in this case, it is sufficient to blow the cool air locally to the region around the nape of the neck for a short period of time until a vehicle air-conditioner of the central type in which the compressor is driven by the engine can blow off the cool air, so to speak, for a transition time. Thus, it should be noted that the lowering of the temperature in the whole passenger compartment is not intended.

In the above-mentioned construction, the seatback passage portion is made of metal and the cooling sheet can be inserted between the seatback passage portion and a front side cushion layer of the seatback in such a way that the cooling sheet is in contact with the front side of the seatback passage portion. With this construction, the seatback passage portion is used as a secondary cooling sink and transmits the cold to the front side cushion layer via the cooling sheet to lower also the temperature in the seatback, thereby being able to give the user an increased cool feeling.

For example, the air-generating mechanism is constructed in such a way that the Peltier module and the blower are integrally embedded in a seat cushion of the seat along with the air guide passage part. The air guide passage part can be constructed in a shape such that the blowoff port opens at the front end of the seat cushion. The air-conditioned air is blown off to the backs of the knees, thereby smoothly lessening an uncomfortable feeling of the user.

In this case, the Peltier module can be embedded in a rear portion of the seat cushion in such a way that the cooling block faces upward. The air guide passage part can be constructed so as to have a seat cushion passage portion for guiding the air passing through the first side (cooling block) to the front position. The heat sink of the Peltier module can be arranged so as to face down in the seat cushion and the exhaust heat from the heat sink can be discharged from the bottom surface of the seat cushion. With this, the exhaust heat from the Peltier module is not discharged to the front side of the seat cushion and the blowing-off of the cool air to the region at the backs of the knees is not disturbed.

Moreover, this construction is of the type in which the exhaust heat is discharged from the heat radiation port into the passenger compartment and hence can eliminate the need for adding a heat exhaust duct to the vehicle body, thereby being simplified. Also in this case, the seat cushion passage portion is made of metal and a cooling sheet can be inserted between the seat cushion passage portion and an upper cushion layer of the seat cushion in such a way that the cooling sheet is in contact with the upper surface of the seat cushion passage portion. With this construction, the cold can be transmitted to the top of the seat cushion, thereby being able to give the user an increased cool feeling.

Also in any one of the above-mentioned constructions, the blower can be disposed on an upstream position of the Peltier module with respect to the flow of air. Also, the air guide passage part can be separately formed into a first passage for guiding the air blown by the blower to the first side of the Peltier module and a second passage for guiding the air blown by the blower to the heat sink. With this, the air for passing through the first side of the Peltier module and the air for passing through a second side of the Peltier module, that is, the heat sink, can be generated by a single blower. Thus, a structure of the air-generating mechanism is simplified.

According to a sixth aspect of the present invention, the local air conditioning system for a vehicle includes the body temperature measuring means for measuring the body temperature of the user seated on the seat and the passenger compartment temperature measuring means for measuring temperature in the passenger compartment of the vehicle. The controlling means controls the local air-conditioning unit to perform the cooling operation on condition that a measured body temperature is higher than a predetermined first body temperature and a measured temperature of the passenger compartment is equal to or higher than a predetermined first compartment temperature. In this manner, when the temperature in the passenger compartment is surely high and the user surely feels the passenger compartment being hot, the local cooling operation is appropriately performed.

According to a seventh aspect of the present invention, the air-generating mechanism can be constructed as a mechanism having polarity switching means for switching or reversing polarity of the Peltier module driven by the drive unit. The controlling means can switch the polarity switching means to a reverse polarity side in which the first side (cooling block) is brought to a hot side on condition that the measured body temperature is lower than a predetermined second body temperature that is lower than the predetermined first body temperature and the measured temperature of the passenger compartment is lower than a predetermined second compartment temperature that is lower than the predetermined first compartment temperature. With this, the cooling block of the Peltier module can be replaced by the heat sink and hence the warm air can be blown off from the blowoff port. When the temperature in the passenger compartment is low and the body temperature of the user is also low (in other words, the user feels cold), the warm air can be blown off to the user by reversing the polarity of the Peltier module.

According to an eighth aspect of the present invention, a method of controlling a local air conditioning unit, which is disposed in a seat of a vehicle, includes acquiring information including at least one of a position and an action of a user; identifying a current scene from a plurality of scenes that is provided by sectioning a series of user's action relating to utilizing the vehicle, based on the acquired information; and controlling the local air conditioning unit to perform one of a heating operation and a cooling operation for a predetermined portion of the seat when the current scene is determined as a getting-in-vehicle scene that includes at least one of a user's action of getting in the vehicle and an user's action of sitting on the seat, the getting-in-vehicle scene being one of the plurality of scenes.

Since a local cooling operation or a local heating operation is performed right after the user gets in the vehicle, an uncomfortable feeling that the user will feel right after the user gets in the vehicle can be timely and efficiently lessened

BRIEF DESCRIPTION OF THE DRAWINGS

Other objects, features and advantages of the present invention will become more apparent from the following detailed description made with reference to the accompanying drawings, in which like parts are designated by like reference numbers and in which.

FIG. 9 is a flowchart showing a control processing of the local air conditioning system according to the embodiment;

FIG. 10A is a diagram showing action scenes regarding a user and conditions of flags used in a scene identifying processing of the local air conditioning system according to the embodiment; and FIG. 10B is a flowchart showing the scene identifying processing of the local air conditioning system according to the embodiment.

DETAILED DESCRIPTION OF EXEMPLARY EMBODIMENT

Figure 1:
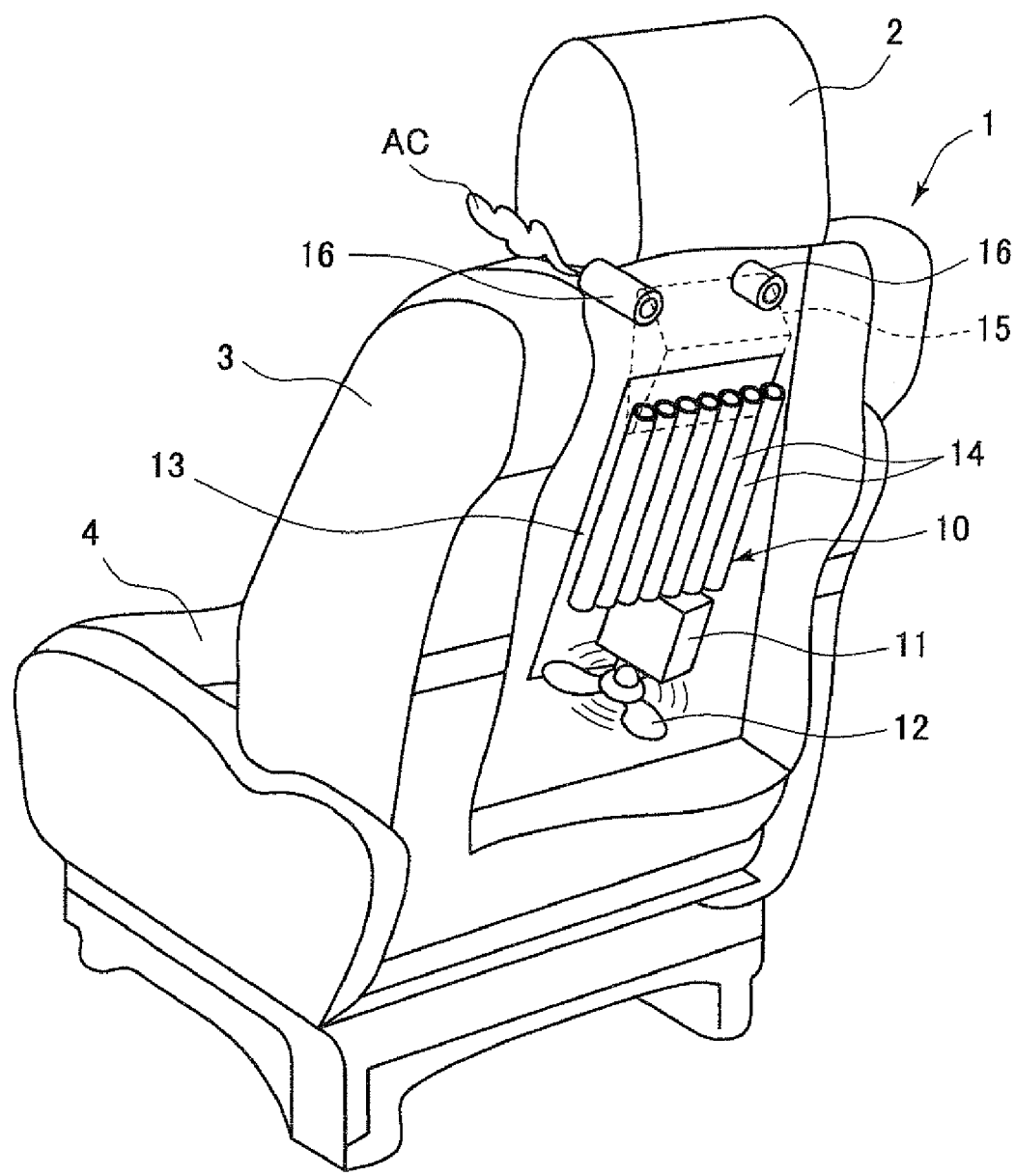
FIG. 1 is a schematic perspective view of a seat in which local air conditioning units of a local air conditioning system is mounted according to an embodiment of the present invention.
Figure 3:
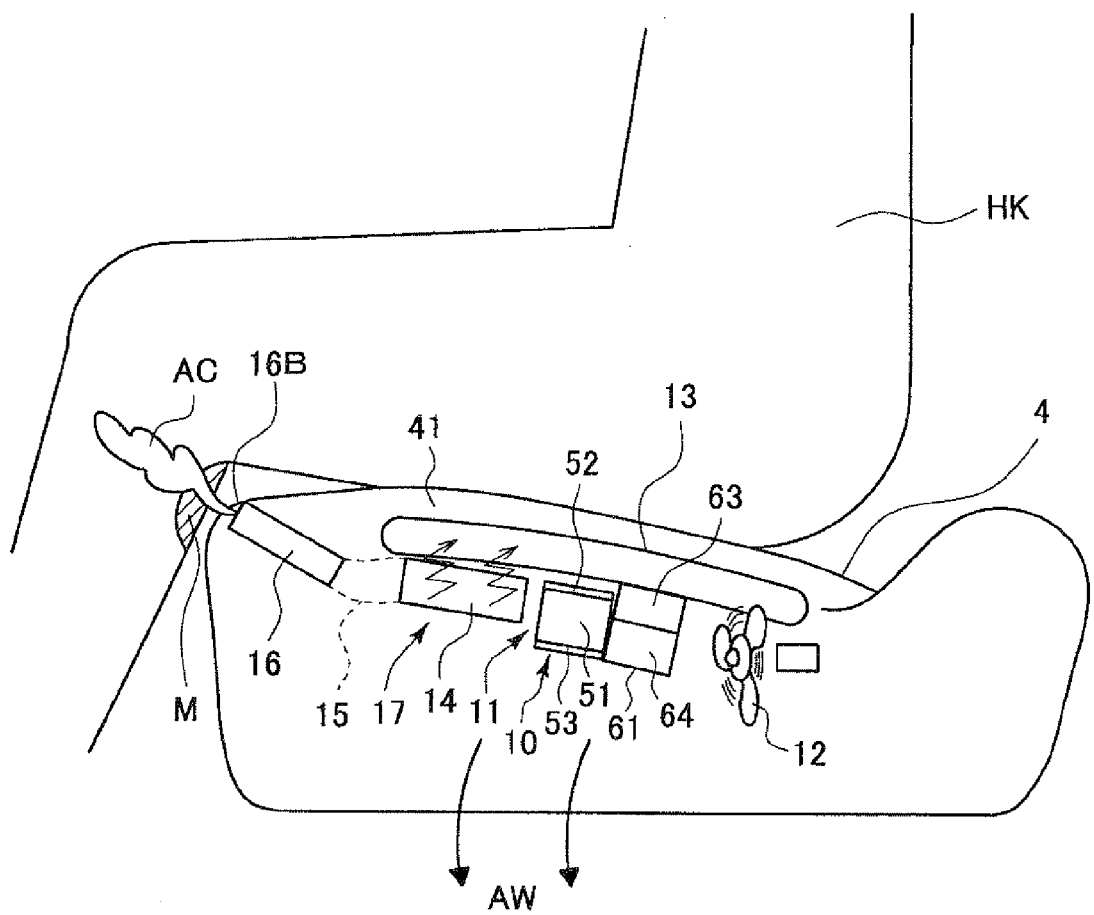
FIG. 3 is a schematic cross-sectional view of a seat cushion of the seat with the local air conditioning unit according to the embodiment.

An exemplary embodiment of the present invention will now be described with reference to the accompanying drawings. Referring to FIG. 1, a vehicle local air conditioning system includes a local air conditioning unit (local cooling unit) 10 mounted in a seat 1 of a vehicle. In the present embodiment, the local air conditioning system includes two local air conditioning units 10. One is embedded in a seatback 3 of the seat 1 and the other is embedded in a seat cushion 4 of the seat 1, as shown in FIGS. 1 and 3. Here, the seat 1 can be any seats of the vehicle, such as a front seat, a rear seat, and the like. The two local air conditioning units 10 generally have a similar structure. Thus, like component parts are denoted by like reference numerals.

The local cooling units 10 are provided for locally cooling or heating predetermined portions, such as high body temperature portions, of a user seated on the seat 1. For example, the local air conditioning unit 10 embedded in the seatback 3 is used for locally cooling or heating a region around the nape of the neck of the user, and the local air conditioning unit 10 embedded in the seat cushion 4 is used for locally cooling or heating a region around the backs of the knees of the user. Although the local cooling unit 10 performs a cooling operation and a heating operation, a structure of the local air conditioning unit 10 will be hereinafter described mainly based on an example when the local air conditioning unit 10 performs a cooling operation.

Both of the local air conditioning units 10 are the same in a basic structure and each of which includes an air-generating mechanism for blowing air-conditioned air, such as cool air, to the predetermined high body temperature portion. Describing the seatback 3 as an example, the high body temperature portion is determined by an area excluding a portion, such as the back of the user, that is in close contact with the seatback 3. For example, as shown in FIG. 2, the region around the nape of the neck of the user is determined as the high body temperature portion.

Referring to FIGS. 1, 2A, 2B and 4, the air-generating mechanism 10 generally includes a Peltier module 11, a drive unit 101, a blower 12, an air guide passage part 17. The drive unit 101 is provided for energizing the Peltier module 11 normally in a polarity in such a way that a cooling block 52 is brought to a lower temperature side (i.e., a cold side). The blower 12 is disposed to generate air toward the cooling block 52. The air guide passage part 17 is embedded in the seat 1 and is disposed to introduce air cooled by the cooling block 52 toward blowoff ports 16B formed in correspondence to the high body temperature portion.

In the present embodiment, the Peltier module 11 and the blower 12 are integrally embedded in the seatback 3 along with the air guide passage part 17. Alternatively, the Peltier module 11 and the blower 12 may be disposed outside the seat 1. In this case, the air guide passage part 17 is disposed such that the cooled air generated by the Peltier module 11 may be drawn into the seatback 3 through the air guide passage part 17. The air guide passage part 17 is in communication with the blowoff ports 16B. For example, the blowoff ports 16B are open at opposite sides of a headrest 2 of the seat 1 with respect to a vehicle right and left direction.

The Peltier module 11 includes a well-known Peltier element 51, a cooling block 52, and a heat sink 53 for radiating heat. The Peltier element 51 is supplied with a DC current in its thickness direction, thereby being electrically driven in such a way that one surface thereof is brought to a heat absorbing surface, that is, the cold side, and the other surface is brought to a heat radiating surface, that is, a hot side. The cooling block 52 is made of metal.

Figure 2A:
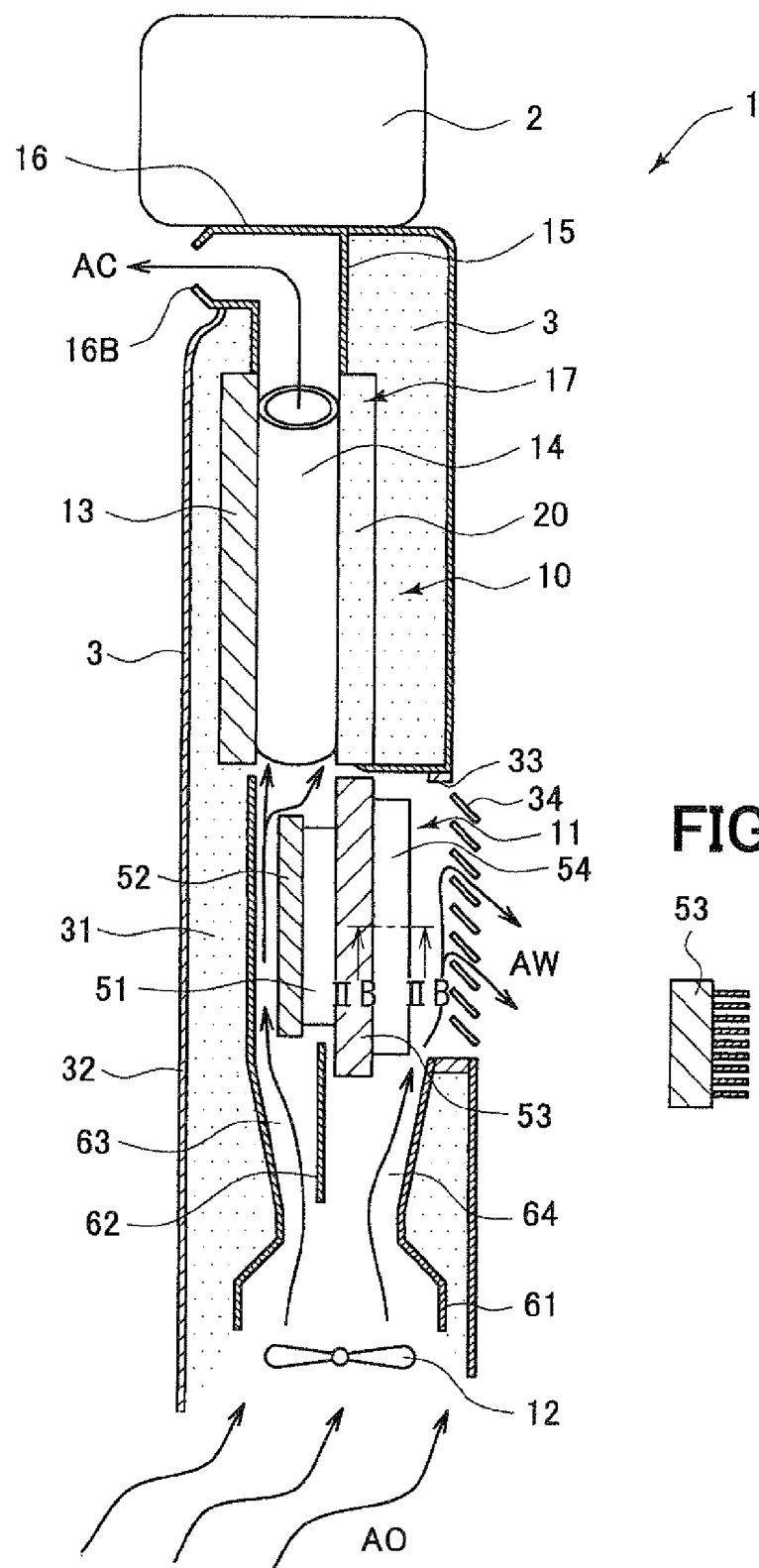
FIG. 2A is a schematic cross-sectional view of a seatback of the seat with the local air conditioning unit according to the embodiment.
Figure 2B:
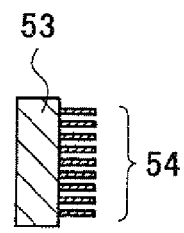
FIG. 2B is an enlarged cross-sectional view taken along a line IIB-IIB in FIG. 2A.

The cooling block 52 is disposed in close contact with the surface of the Peltier element 51, the surface being brought to the cool side when the DC current is passed in a forward direction. The heat sink 53 is made of metal. The heat sink 53 is disposed in close contact with the other surface of the Peltier element 51, the other surface being brought to a heat radiating side when the DC current is passed in the forward direction. Fins 54 for facilitating heat radiation are integrated with the back surface of the heat sink 53, as shown in FIG. 2B.

The cooling block 52 is embedded in a substantially lower portion, such as in a lower half portion, of the seatback 3 in such a way as to face the front side of the seatback 3. The air guide passage part 17 has a back passage portion 14 for guiding the cooled air passing through the cooling block 52 upward, a connecting passage portion 15, and blowoff passage portions 16. The connecting passage portion 15 is disposed to communicate the back passage portion 14 with the blowoff passage portions 16.

The back passage portion 14 is, for example, made of metal, and forms an air passage in a longitudinal direction of the seatback 3, such as, an up and down direction. A cooling sheet 13 is interposed between a front cushion layer 31 of the seatback 3 and the back passage portion 14. The cooling sheet 13 is in contact with the front surface of the back passage portion 14. The cooling sheet 13 is, for example, formed of a cold storage material and has a predetermined shape. The front surface of the front cushion layer 31 is covered with a seat cover 32.

The heat sink 53 of the Peltier module 11 is disposed so as to face the back side of the seatback 3, that is, disposed on the side opposite to the cooling block 52 with respect to the Peltier element 51. The rear portion of the seatback 3 forms a heat radiation port 33 at a position corresponding to the heat sink 53. Thus, exhaust heat AW from the heat sink 53 is radiated through the heat radiation port 33. The heat radiation port 33 is provided with a protective louver 34.

The blower 12 is driven by a motor, and is disposed on an upstream position of the Peltier module 11 with respect to the flow of air. In the setback 3, the blower 12 is disposed under the Peltier module 11, for example. An air flow separating pipe portion 61 is disposed between the blower 12 and the Peltier module 11, as a portion of the air guide passage part 17.

The air flow separating pipe portion 61 forms a first passage 63, which guides an air flow from the blower 12 to the cooling block 52 of the Peltier module 11, and a second passage 64, which guides the air flow from the blower 12 to the heat sink 53. The first passage 63 and the second passage 64 are separated from each other by a partition wall 62.

As shown in FIG. 1, the back passage portion 14 is constructed of plural metallic tubes, which are, for example, made of Cu or Al. The metallic tubes are arranged in close contact with each other and in parallel in the right and left direction of the seatback 3. Also, the metallic tubes are arranged within an area of the cooling sheet 13. When the blower 12 is operated, as shown in FIG. 2A, air (denoted by arrows AO), such as air in the passenger compartment, is introduced into the air flow separating pipe portion 61. The air passing through the first passage 63 is cooled by the surface of the cooling block 52. The cool air produced in this manner flows through the back passage portion 14 and is collected in the connecting passage portion 15. Then, the air is blown off from the blowoff ports 16B of the blowoff passage portions 16 toward the region around the nape of the neck.

As shown in FIG. 3, the air-generating mechanism 10 of the seat cushion 4 has the Peltier module 1 the blower 12, and the air guide passage part 17, similar to the air-generating mechanism 10 of the seatback 3. The Peltier module 11 and the blower 12 are embedded in the seat cushion 4 along with the air guide passage part 17. The air guide passage part 17 is embedded in the seat cushion 4 in such a way that its blowoff ports 16B open in the front end surface of the seat cushion 4 to correspond to the region M around the backs of the knees of the user. The Peltier module 11 is embedded in the rear portion of the seat cushion 4 in such a way that the cooling block 52 faces up in the seat cushion 4. The air guide passage part 17 has seat cushion passage portions 14 (instead of the seatback passage portion 14) for guiding cool air passing through the cooling block 52 to a front position of the seat cushion 4.

The heat sink 53 of the Peltier module 11 is disposed so as to face down in the seat cushion 4, and exhaust heat AW from the heat sink 53 is radiated from the bottom side of the seat cushion 4. The seat cushion passage portions 14 are made of metal, such as Cu or Al. The cooling sheet 13 is interposed between the seat cushion passage portion 14 and an upper cushion layer 41 of the seat cushion 4. The cooling sheet 13 is in contact with the top surface of the seat cushion passage portion 14.

Figure 4:
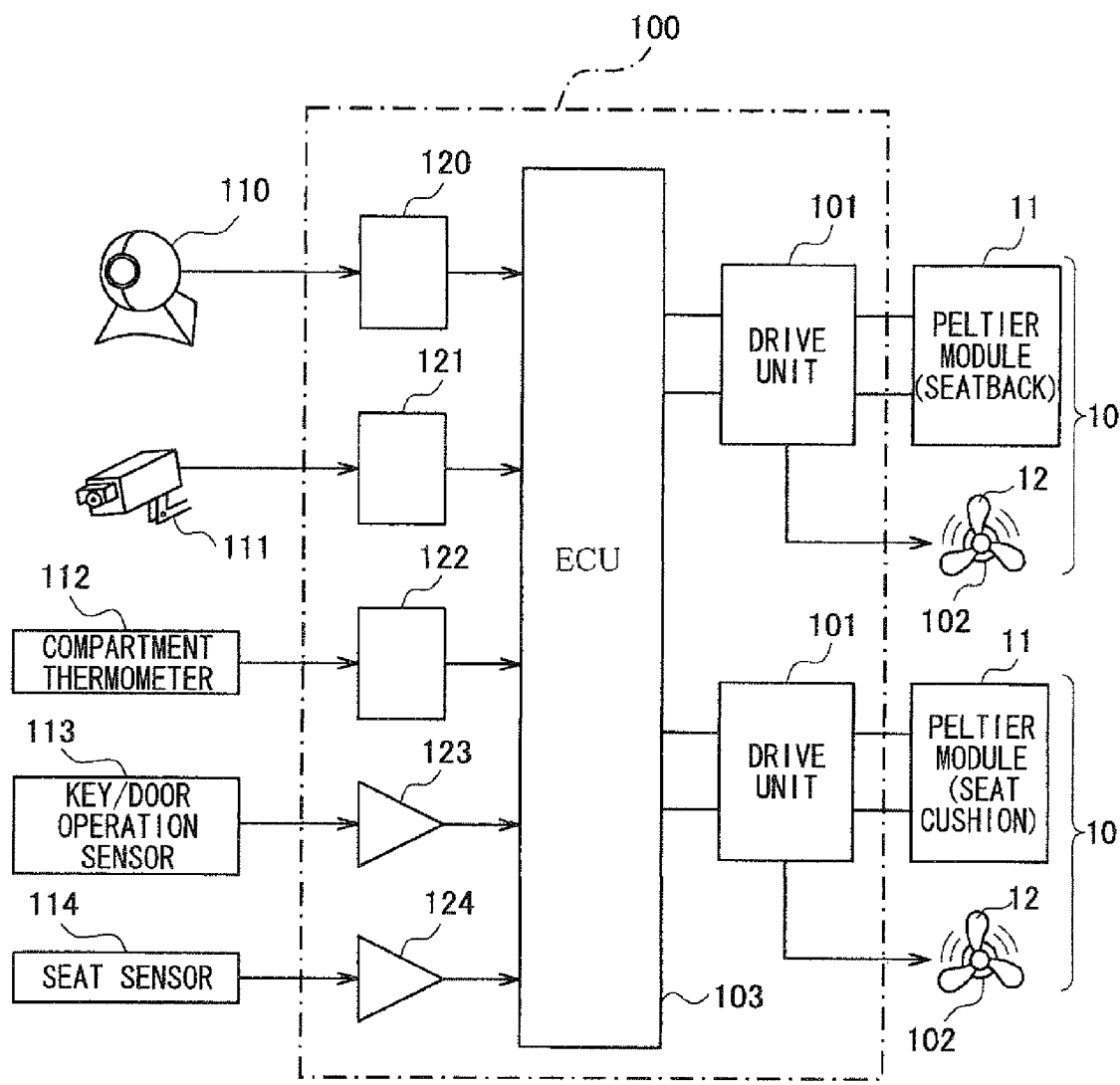
FIG. 4 is a block diagram showing an example of an electric construction of the local air conditioning system according to the embodiment.

Next, an electric construction of the above-mentioned local air conditioning system will be described with reference to FIG. 4. The electric construction includes a control circuit 100 as a main part. The control circuit 100 mainly includes an ECU 103 constructed as a microprocessor. A camera 110, a thermographic camera 111, and a passenger compartment thermometer 112 are connected to the ECU 103 via input interfaces 120, 121, and 122, respectively. Moreover, a key/door operation sensor 113 is connected to the ECU 103 via an amplifier 123. The key/door operation sensor 113 is, for example, constructed of a door lock sensor and a door courtesy switch.

For example, the key/door operation sensor 113 detects the presence or absence of the key operation of a door adjacent to the seat 1, such as, a locking operation or unlocking operation of the key. Alternatively, or in addition to this, the key/door operation sensor 113 detects the presence or absence of an opening and closing operation of the door. Further, a seat sensor 114 that is embedded in the seat surface of the seat cushion 4 is also connected to the ECU 103 via an amplifier 124.

Figure 5:
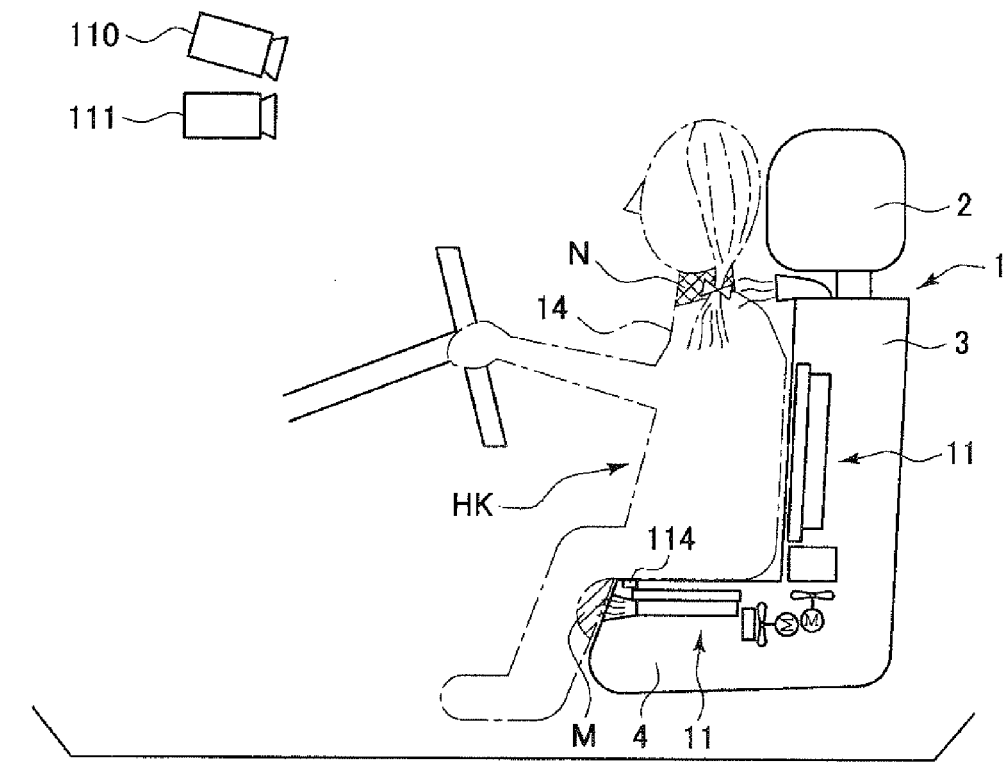
FIG. 5 is a schematic view for showing an arrangement of a camera, a thermographic camera, and sensors of the local air conditioning system according to the embodiment.
Figure 6A:
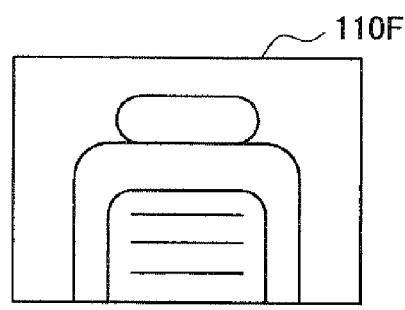
FIGS. 6A and 6B are views for showing a field of view of the camera according to the embodiment.
Figure 6B:

As shown in FIG. 5, the camera 110 shoots the seat 1 from the front, and is used for determining whether or not a person (user) HK is seated on the seat 1. As shown in FIGS. 6A and 6B, a field of view 110F of the camera 110 is predetermined so as to include the seatback 3, that is, an upper half body of the person HK seated on the seat 1. For example, the field of view 110F of the camera 110 includes at least a portion including and above the neck N of the person HK.

The seat sensor 114 is constructed of a load sensor or the like and detects in an auxiliary manner whether or not a person HK is seated on the seat 1. For example, it can be determined that a person HK is seated on the seat 1 when a predetermined load is detected by the seat sensor 114 and a face image of the person HK is detected in the field of view 110F of the camera 110. Thus, faulty detections due to objects placed on the seat 1, disturbance light and the like are reduced.

Moreover, since the seat sensor 4 is used in addition to the camera 110, even if the accuracy of identifying a face image is slightly decreased, the accuracy of detecting the presence of the person on the seat 1 is maintained, which in turn contributes to a reduction in algorithm. Here, the algorithm of detecting a face image is well-known and hence its detailed description will be omitted.

The thermographic camera 111 is a well-known camera that two-dimensionally measures the wavelength distribution of far-infrared ray radiated from an object by a far-infrared ray sensor disposed in a light emitting portion and produces temperature mapping data, such as a thermographic image, on the basis of the measurement results.

Figure 7:
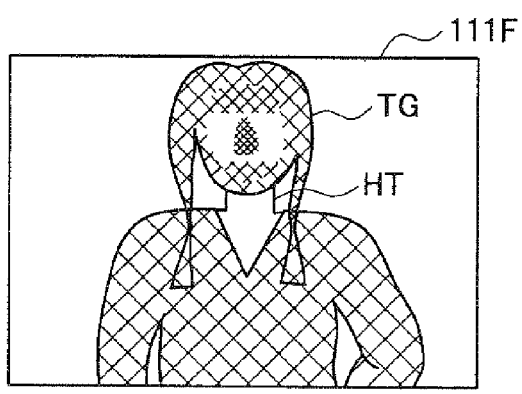
FIG. 7 is a view for showing a field of view of the thermographic camera according to the embodiment.

As shown in FIG. 7, the thermographic camera 111 is set such that an area including and above the neck of the person seated on the seat 1 is included in a field of view 111F. The thermographic camera 111 measures temperature distribution TG of the user, particularly, an exposed skin portion (bared portion) of and above the neck of the user. In general, the nape of the neck appears as a higher temperature region HT indicating a temperature higher than a peripheral portion and hence the higher temperature region HT can be identified along with temperature on the thermographic image.

In this regard, when the field 110F of the camera 110 is made to coincide with the field 111F of the thermographic camera 111, the nape of the neck can be identified with more accuracy by referring to the image of the camera 110. Moreover, the average temperature of the region HT around the nape of the neck can be determined as a body temperature. Although accuracy will be slightly decreased, the body temperature can be determined by the temperature of the face.

The ECU 103 is connected to the drive units 101 of the air-generating mechanisms 10 of the seatback 3 and the seat cushion 4 for driving and controlling the Peltier module 11 and the blower 12. Each of the drive units 101 energizes the Peltier module 11 such that the Peltier module 11 is normally in a polarity in which the cooling block 52 is brought to the cold side (hereinafter referred to as "forward polarity"). Depending on the temperature of the passenger compartment and/or a body temperature, the Peltier module 11 is driven to have an opposite polarity (hereinafter referred to as "backward polarity").

Figure 8:
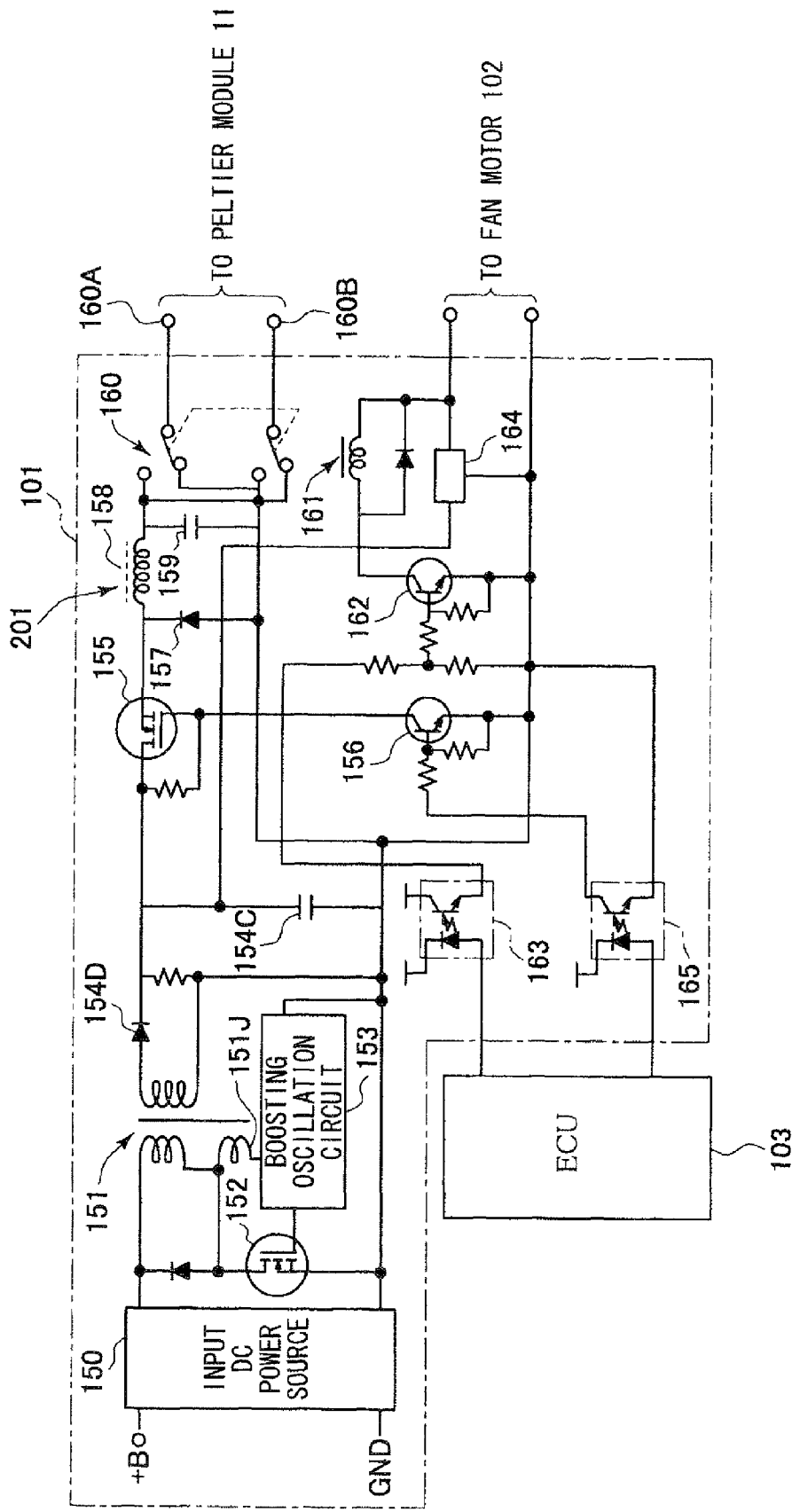
FIG. 8 is a circuit diagram of a drive unit of a Peltier module of the local air conditioning system according to the embodiment.

FIG. 8 shows an example of a circuit construction of the drive unit 101. A drive power source is constructed in an insulation type in consideration of preventing excessive voltage from being applied to the Peltier element 51. For example, the drive unit 101 has an input-side DOC power source 150 that receives a vehicle-mounted battery voltage +B as an input voltage. The DC output voltage is switched by a booting switching transistor 152 driven by a boosting oscillation circuit 153 and is inputted to the primary side of a boosting transformer 151.

In the present embodiment, the booting switching transistor 152 is constructed of a power FET, and a booting switching frequency is 10 to 30 kHz (for example, 15 kHz). The secondary boosting output voltage of the transformer 151 is 8 to 15 V (for example, 12 V). Here, the boosting oscillation circuit 153 is constructed as a self-excited oscillation circuit that uses a part of primary inductance of the transformer 151.

The secondary boosting output voltage of the transformer 151 is half-wave rectified by a diode 154D, smoothed by a capacitor 154C and then inputted to a PWM switching transistor 155. The PWM switching transistor 155 is constructed of a power FET and is PWM-switched at a duty ratio (for example, 50 to 100%), which is determined by the ECU 103. The ECU 103 regulates the duty ratio appropriately in response to the body temperature of the person and the temperature in the passenger compartment to regulate the output of the Peltier element 51. The PWM switching transistor 155 is switched by a photo-coupler 163 via a gate driving transistor 156.

The Peltier element 51 is constructed as a metal conductor having a large conductive cross section. Thus, if a PWM switching voltage waveform is directly inputted to the Peltier element 51, an eddy current is generated when current is intercepted at the edge of the waveform. As such, voltage opposite to a target polarity is supplied to the Peltier element 51, and a large amount of joule heat is generated. As a result, cooling efficiency is decreased.

In the present embodiment, therefore, the above-mentioned PWM switching voltage waveform is smoothed to a direct current drive voltage (output voltage ranges, for example, from 6 to 12 V: output current ranges, for example, from 3 to 6 A) by a drive smoothing circuit 201 having a coil 158 and a capacitor 159, and the direct current drive voltage is supplied to the Peltier module 11 via a polarity switching switch 160. Here, the PWM switching frequency ranges, for example, from 1 to 5 kHz and is set smaller than a boosting switching frequency.

The polarity switching switch 160 is constructed as a relay switch in the present embodiment and its operation is controlled by a photo-coupler 165 via a relay driving transistor 162. Here, the polarity switching switch 160 is switched in such a way that when the relay driving transistor 162 is OFF, a terminal 160A is brought to a power source input and a terminal 160B is brought to the ground (forward polarity) and that when the relay driving transistor 162 is ON, the terminal 160A is brought to the ground and the terminal 160B is brought to the power source input (backward polarity). Moreover, a motor driving output to the blower 12 is taken out in a non-switching state via a voltage stabilizing regulator IC 164 from a preceding portion of the PWM switching transistor 155 on the secondary side of the transformer 151.

In the present embodiment, a boosting circuit is built in so as to compensate variations in the vehicle-mounted battery voltage +B. However, when the operation of the Peltier element 51 can be guaranteed, for example, when it can be guaranteed that the range of voltage outputted to drive the Peltier element 51 is always smaller than the range of variations in the vehicle-mounted battery voltage +B, this boosting circuit can be omitted.

In this case, it is sufficient to additionally provide an output part to the Peltier element 51 with a voltage monitoring part and to additionally provide a regulator section that feeds back the monitored voltage to the duty ratio control of the PWM switching to thereby stabilize voltage. Moreover, even when the voltage outputted to drive the Peltier element 51 is slightly higher than the range of variations in the vehicle-mounted battery voltage +B, if the regulator section is constructed as a well-known boosting type step-up circuit, the boosting circuit can be similarly omitted.

Hereinafter, the flow of the control of operating the local air conditioning system by the ECU 103 will be described referring FIGS. 9, 10A and 10B. First, in step S301 of FIG. 9, scene information is acquired. The scene information is acquired on the basis of the input states of the camera 110, the key/door operation sensor 113, the seat sensor 114, and the like. In other words, information, such as a position and an action of the user, required to estimate a present scene of the user is acquired.

As shown in FIG. 10A, a series of user's operations and actions relating to utilizing the vehicle is previously determined into plural scenes in a time sequence, such as an approaching scene SCN1, a getting-in scene SCN2, a sitting scene SCN3, a driving/staying scene SCN4, a getting-off scene SCN5, and a separating scene SCN6. The sitting scene SCN3 provides a getting-in-vehicle scene together with the getting-in scene SCN2.

FIG. 108 is a flowchart showing an example of the flow of scene identifying processing. For example, the approaching scene SCN1 is identified when it is determined that a user approaches the vehicle, such as, comes in a predetermined distance area of the vehicle (S2 to S4). In a case that a well-known smart entry mode is employed, when a wireless key is not detected in the passenger compartment but is detected in a search area outside the passenger compartment, it is determined that a user is in the predetermined distance area, and hence the approaching scene SCN1 can be identified.

The getting-in scene SCN2 and the getting-off scene SCN5 are identified on the basis of the output of the key/door operation sensor 113 indicative of a door-opened operation (S5 to S7, S16 to S19). However, it is difficult to distinguish the getting-in scene SCN2 from the getting-off scene SCN5 only by the information indicative of the door-opened operation. Therefore, a scene flag 350 for storing and holding present scene identifying information is set in the memory of the ECU 103 to thereby determine whether the present scene is the getting-in scene SCN2 or the getting-off scene SCN5.

The scene flag 350 has individual scene flags corresponding to respective scenes. Every time respective scenes whose arrival orders are determined in time sequence arrive, the scene flags corresponding to the scenes are set to "arrival (flag values are set to 1)." By identifying the newest flag of the individual scene flags whose values are set to 1 (the last flag of a series of individual scene flags set to 1) of the scene flag 350, it is possible to identify which scene the present scene progresses to. In the present embodiment, when the scenes up to the sitting scene SCN3 are finished, it is determined that "the getting-in-vehicle scene has arrived."

Here, the sitting scene SCN3 and the driving/staying scene SCN4 are identified by whether or not the above-mentioned seat sensor 4 detects the user (S8 to S11, S12 to S15). A period of time after the user gets in the vehicle until an ignition switch is turned ON is recognized as the sitting scene SCN3. Also, a period of time during which a continuously seated condition of the user is detected after the user gets in the vehicle while the ignition switch is OFF is recognized as the sitting scene SCN3. For example, a seated timer is started to count time St after the sitting scene SCN3 is identified (S11). When it is determined that the user is continuously being seated on the seat 1, that is, it is determined that a predetermined time period t1 elapses (St≧t1 at S14), the driving/staying scene SCN4 is identified.

Moreover, after the getting-off scene SCN5, when a door-closed operation is detected by the key-door operation sensor 113 and the seated condition of the user is not detected by the seat sensor 4, the separating scene SCN6 is identified. (S21 to S23) After the separating scene SCN6 is identified, a getting-off timer is started to count time Gt. When a predetermined time period t2 elapses since the separating scene SCN6 is identified (Gt≧t2 at S24), the flags are reset.

Returning to FIG. 9, when the present scene is identified as the getting-in-vehicle scene at S302, the body temperature of the user seated on the seat 1 is detected based on the thermographic image at S303. It is determined whether the body temperature, which is, for example, represented by the temperature of the face or the region HT around the nape of the neck shown in FIG. 7 is equal to or higher than an upper threshold of the body temperature (predetermined first body temperature) at S304. The upper threshold is, for example, between 36.8 and 37.5° C.

When it is determined that the detected body temperature is equal to or higher than the upper threshold of the body temperature at S304, the temperature in the passenger compartment detected by the passenger compartment thermometer 112 is read at S305. The above situation may occur when the user returns to the vehicle from a hot place, for example.

When it is determined at S306 that the temperature in the passenger compartment is higher than an upper threshold of a compartment temperature (predetermined first compartment temperature), the Peltier modules 11 are driven in the forward polarity so that the cool air is generated (cool air blowing-off mode) at S307. The upper threshold of the compartment temperature is, for example, between 30 and 40° C.

Here, by setting the voltage of driving the Peltier element 51 (the above-mentioned duty ratio of the PWM switching) higher as the difference between the detected temperature of the passenger compartment and the upper threshold of the compartment temperature becomes larger, proper coolness responsive to the temperature can be given to the user in the passenger compartment.

On the other hand, when it is determined at S306 that the temperature in the passenger compartment is lower than the upper threshold of the compartment temperature, the cool air is not generated by the Peltier module 11.

When it is determined at S304 that the detected body temperature is lower than the upper threshold of the body temperature, it is determined whether the detected body temperature is equal to or lower than a lower threshold of the body temperature (predetermined second body temperature) at S308. The lower threshold of the body temperature is, for example, 30° C.

When it is determined that the detected body temperature is equal to or lower than the lower threshold of the body temperature at S308, the temperature in the passenger compartment is detected at S309. The above situation may occur when the user returns to the vehicle from a cold place, for example.

When the detected temperature of the passenger compartment is equal to or lower than a lower threshold of the compartment temperature (predetermined second compartment temperature) at S310, the Peltier module 11 is driven in a backward polarity so that warm air is generated in S311 (warm air blowing-off mode). The lower threshold of the compartment temperature is, for example, between 5 and 12° C. Also in this case, by setting the voltage of driving the Peltier element 51 (the above-mentioned duty ratio of the PWM switching) higher as the difference between the detected temperature in the passenger compartment and the lower threshold of the compartment temperature becomes larger, proper warmness responsive to the temperature can be given to the user in the passenger compartment.

On the other hand, when it is determined at S310 that the temperature in the passenger compartment is higher than the lower threshold of the compartment temperature, the warm air is not generated. Moreover, when it is determined at S308 that the detected body temperature is higher than the lower threshold of the body temperature, that is, the body temperature is between the lower threshold and the upper threshold of the body temperature, neither the cool air blowing-off mode nor the warm air blowing-off mode are performed.

In this regard, a method for controlling the operation of the Peltier module 11 according to the body temperature is employed in the above-mentioned embodiment, but it is also possible to control the operation of the Peltier module 11 on the basis of the temperature in the passenger compartment without reference to the body temperature. In this case, when the temperature in the passenger compartment is equal to or higher than the upper threshold of the compartment temperature, the Peltier module 11 is operated in the cool air blowing-off mode. When the temperature in the passenger compartment is equal to or lower than the lower threshold of the compartment temperature, the Peltier module 11 is operated in the warm air blowing-off mode. When the temperature in the passenger compartment is between the upper threshold and the lower threshold of the compartment temperature, neither the cool air blowing-off mode nor the warm air blowing-off mode are performed.

Additional advantages and modifications will readily occur to those skilled in the art. The invention in its broader term is therefore not limited to the specific details, representative apparatus, and illustrative examples shown and described.

What is claimed is:

1. A local air conditioning system for a vehicle, said system comprising:
a local air conditioning unit disposed in a seat of the vehicle for performing one of a cooling operation and a heating operation for a predetermined portion of the seat;
means for acquiring information regarding a user;
means for identifying a current scene based on the information acquired by the information acquiring means; and means for controlling the local air conditioning unit on condition that the current scene is identified as a getting-in-vehicle scene in which the user gets in the vehicle and sits on the seat, wherein the local air conditioning unit includes an air generating mechanism that is capable of generating one of cool air and warm air and introducing the one toward the predetermined portion of the seat, the predetermined portion of the seat is provided in an area excluding a contact area that makes close contact with a body of a user when the user is seated on the seat, the air generating mechanism includes a blower for generating a flow of air, a Peltier module for adjusting a temperature of air blown by the blower, a blowoff port disposed at the predetermined portion of the seat for blowing off the air, an air guide passage part disposed within the seat to guide air blown by the blower to the blowoff port via the Peltier module, and a drive unit capable of driving the Peltier module, the Peltier module, the blower and the air guide passage part are integrally embedded in a seatback of the seat, the blowoff port forms openings on opposite sides of a headrest of the seat, the Peltier module is embedded in a lower portion of the seatback such that a first side thereof faces a front side of the seatback and a second side thereof faces a rear side of the seatback, the first side being brought to a cold side when the Peltier module is driven in a forward polarity, the second side including a heat sink portion, the air guide passage part includes a seatback passage portion that extends in a substantially upward direction for guiding the air having passed through the first side of the Peltier module toward the blowoff port, the air generating mechanism further includes a waste heat discharging port on the rear side of the seatback for discharging a waste heat from the heat sink, the air generating mechanism further includes a cooling sheet between the seatback passage portion and a front cushion layer of the seatback, and the seatback passage portion is made of metal, and is in contact with the cooling sheet.

2. The local air conditioning system according to claim 1, wherein the Peltier module and the blower are integrally embedded in the seat with the air guide passage part.

3. The local air conditioning system according to claim 1, wherein the Peltier module, the blower and the air guide passage part are integrally embedded in a seat cushion of the seat, and the blowoff port forms openings at a front end of the seat cushion.

4. The local air conditioning system according to claim 3, wherein the Peltier module is embedded in a rear portion of the seat cushion such that a first side thereof faces up and a second side thereof faces down, the first side being brought to a cold side when the Peltier module is driven in a forward polarity, the second side including a heat sink portion, the heat sink portion is disposed such that a waste heat is discharged from a bottom surface of the seat cushion, and the air guide passage part includes a seat cushion passage portion that extends in a frontward direction for guiding the air having passed through the first side of the Peltier module toward the blowoff port.

5. The local air conditioning system according to claim 2, wherein the blower is disposed upstream of the Peltier module with respect to a flow of air, and the air guide passage part includes a first passage for introducing the air blown by the blower toward a first side of the Peltier module and a second passage for introducing the air blown by the blower toward a second side of the Peltier module, the first side being brought to a cold side and the second side being brought to a hot side when the Peltier module is driven in a forward polarity.

6. A method of controlling the local air conditioning system as in claim 1 that is disposed in a seat of a vehicle, the method comprising:

acquiring information including at least one of a position and an action of a user;

identifying a current scene from a plurality of scenes that is provided by sectioning a series of user's action relating to utilizing the vehicle, based on the acquired information; and controlling the local air conditioning unit to perform one of a heating operation and a cooling operation for a predetermined portion of the seat when the current scene is determined as a getting-in-vehicle scene that includes at least one of a user's action of getting in the vehicle and an user's action of sitting on the seat, the getting-in-vehicle scene being one of the plurality of scenes.

7. The local air conditioning system according to claim 1, wherein the seatback passage portion includes a plurality of tubes that are arranged in close contact with each other and within an area of the cooling sheet.

8. The local air conditioning system according to claim 1, wherein the predetermined portion of the seat is an upper portion of a backrest of the seat to correspond to an area around a nape of a neck of a user seated on the seat.

9. The local air conditioning system according to claim 1, wherein the predetermined portion of the seat is a front portion of a seat cushion of the seat to correspond to an area around backs of knees of a user seated on the seat.

10. The local air conditioning system according to claim 1, further comprising:

means for measuring a body temperature of a user seated on the seat, wherein the controlling means controls the local air conditioning unit to perform the cooling operation on condition that the body temperature measured by the body temperature measuring means is equal to or higher than a predetermined first body temperature.

11. The local air conditioning system according to claim 10, wherein the body temperature measuring means includes a thermographic device, and the thermographic device is disposed to measure temperature of a bared portion of and above a neck of a user seated on the seat.

12. The local air conditioning system according to claim 11, wherein the body temperature is determined based on the temperature of the bared portion measured by the thermographic device.

13. The local air conditioning system according to claim 1, further comprising:

means for detecting a temperature of a passenger compartment of the vehicle, wherein the controlling means controls the local air conditioning unit to perform the cooling operation on condition that the temperature of the passenger compartment detected by the passenger compartment temperature detecting means is higher than a predetermined first compartment temperature.

14. The local air conditioning system according to claim 1, further comprising:
means for measuring a body temperature of a user seated on the seat; and
means for detecting a temperature of a passenger compartment of the vehicle, wherein
the controlling means controls the local air conditioning unit to perform the cooling operation on condition that the body temperature measured by the body temperature measuring means is equal to or higher than a predetermined first body temperature and the temperature of the passenger compartment detected by the passenger compartment detecting means is equal to or higher than a predetermined first compartment temperature.

15. The local air conditioning system according to claim 14,
wherein the air generating mechanism includes polarity switching means for switching a polarity of the Peltier module driven by the drive unit,
the controlling means controls the polarity switching means to switch the polarity of the Peltier module to a backward polarity so that air to be blown from the blowoff port is heated by the Peltier module when the measured body temperature is lower than a predetermined second body temperature that is lower than the predetermined first body temperature and the detected temperature of the passenger compartment is lower than a predetermined second compartment temperature that is lower than the predetermined first compartment temperature.

16. The local air conditioning system according to claim 1, wherein
the information includes at least one of a position and an action of a user, and
a series of actions of a user from approaching the vehicle to getting off the vehicle after driving is divided into a plurality of scenes, the getting-in-vehicle scene is one of the plurality of scenes, and the scene identifying means identifies the respective scenes based on the information acquired by the information acquiring means.

17. The method according to claim 6, further comprising:
measuring at least one of a temperature of a body of the user and a temperature of the passenger compartment, wherein the local air conditioning unit is controlled to perform the cooling operation when the measured temperature is equal to or higher than a predetermined temperature.

18. The local air conditioning system, for a vehicle, said system comprising:
a local air conditioning unit disposed in a seat of the vehicle for performing one of a cooling operation and a heating operation for a predetermined portion of the seat;
means for acquiring information regarding a user;
means for identifying a current scene based on the information acquired by the information acquiring means; and
means for controlling the local air conditioning unit on condition that the current scene is identified as a getting-in-vehicle scene in which the user gets in the vehicle and sits on the seat,
wherein
the local air conditioning unit includes an air generating mechanism that is capable of generating one of cool air and warm air and introducing the one toward the predetermined portion of the seat,
the predetermined portion of the seat is provided in an area excluding a contact area that makes close contact with a body of a user when the user is seated on the seat,
the air generating mechanism includes a blower for generating a flow of air, a Peltier module for adjusting a temperature of air blown by the blower, a blowoff port disposed at the predetermined portion of the seat for blowing off the air, an air guide passage part disposed within the seat to guide air blown by the blower to the blowoff port via the Peltier module, and a drive unit capable of driving the Peltier module,
the Peltier module, the blower and the air guide passage part are integrally embedded in a seat cushion of the seat,
the blowoff port forms openings at a front end of the seat cushion,
the Peltier module is embedded in a rear portion of the seat cushion such that a first side thereof faces up and a second side thereof faces down, the first side being brought to a cold side when the Peltier module is driven in a forward polarity, the second side including a heat sink portion,
the heat sink portion is disposed such that a waste heat is discharged from a bottom surface of the seat cushion,
the air guide passage part includes a seat cushion passage portion that extends in a frontward direction for guiding the air having passed through the first side of the Peltier module toward the blowoff port,
the air generating mechanism further includes a cooling sheet between the seat cushion passage portion and an upper cushion layer of the seat cushion, and
the seat cushion passage portion is made of metal, and is in contact with the cooling sheet.

19. The local air conditioning system according to claim 18, wherein
the blower is disposed upstream of the Peltier module with respect to a flow of air, and
the air guide passage part includes a first passage for introducing the air blown by the blower toward a first side of the Peltier module and a second passage for introducing the air blown by the blower toward a second side of the Peltier module, the first side being brought to a cold side and the second side being brought to a hot side when the Peltier module is driven in a forward polarity.

20. A method of controlling the local air conditioning system of claim 18 that is disposed in a seat of a vehicle, the method comprising:
acquiring information including at least one of a position and an action of a user;
identifying a current scene from a plurality of scenes that is provided by sectioning a series of user's action relating to utilizing the vehicle, based on the acquired information; and
controlling the local air conditioning unit to perform one of a heating operation and a cooling operation for a predetermined portion of the seat when the current scene is determined as a getting-in-vehicle scene that includes at least one of a user's action of getting in the vehicle and an user's action of sitting on the seat, the getting-in-vehicle scene being one of the plurality of scenes.

21. The local air conditioning system according to claim 18, wherein the seat cushion passage portion includes a plurality of tubes that are arranged in close contact with each other and within an area of the cooling sheet.

* * * * *